United States Patent
Kaijala et al.

(10) Patent No.: US 6,729,194 B2
(45) Date of Patent: May 4, 2004

(54) HALL EFFECT SEAT BELT TENSION SENSOR

(75) Inventors: Murray Kaijala, Elkhart, IN (US); Dale Teeters, South Bend, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 10/202,727

(22) Filed: Jul. 25, 2002

(65) Prior Publication Data

US 2004/0016304 A1 Jan. 29, 2004

(51) Int. Cl.[7] .................................................. G01L 1/25
(52) U.S. Cl. .............................. 73/862.69; 73/862.391; 73/801.1
(58) Field of Search .............................. 73/862.69, 763, 73/774, 779, 862.391, 801.1, 735

(56) References Cited

U.S. PATENT DOCUMENTS

| | | |
|---|---|---|
| 4,943,087 A | 7/1990 | Sasaki |
| 5,060,977 A | 10/1991 | Saito |
| 5,181,739 A | 1/1993 | Bauer |
| 5,244,231 A | 9/1993 | Bauer |
| 5,309,135 A | 5/1994 | Langford |
| 5,454,591 A | 10/1995 | Mazur |
| 5,494,311 A | 2/1996 | Blackburn |
| 5,570,903 A | 11/1996 | Maister et al. |
| 5,583,476 A | 12/1996 | Langford |
| 5,605,348 A | 2/1997 | Blackburn |
| 5,618,056 A | 4/1997 | Schoos |
| 5,636,864 A | 6/1997 | Hori |
| 5,765,774 A | 6/1998 | Maekawa |
| 5,960,523 A | 10/1999 | Husby |
| 5,965,827 A | 10/1999 | Stanley |
| 5,996,421 A | 12/1999 | Husby |
| 6,081,759 A * | 6/2000 | Husby et al. .................. 701/45 |
| 6,151,540 A | 11/2000 | Anishetty |
| 6,161,439 A | 12/2000 | Stanley |
| 6,205,868 B1 | 3/2001 | Miller |
| 6,209,915 B1 | 4/2001 | Blakesley |
| 6,211,668 B1 * | 4/2001 | Duesler et al. .......... 324/207.2 |
| 6,230,088 B1 | 5/2001 | Husby |
| 6,264,236 B1 | 7/2001 | Aoki |
| 6,264,281 B1 | 7/2001 | Dukatz |
| 6,301,977 B1 | 10/2001 | Stojanovski |
| 6,336,371 B1 | 1/2002 | O'Boyle |
| 6,554,318 B2 * | 4/2003 | Kohut et al. ............. 280/801.1 |
| 2001/0042981 A1 | 11/2001 | Kohut |
| 2001/0054323 A1 | 12/2001 | Faigle |

FOREIGN PATENT DOCUMENTS

WO  WO99/12012  3/1999

* cited by examiner

Primary Examiner—Edward Lefkowitz
Assistant Examiner—Corey Mack
(74) Attorney, Agent, or Firm—Steve Weseman; Mark Bourgeois

(57) ABSTRACT

A hall effect seat belt tension sensor for a vehicle. The sensor has a housing mounted to a seat belt. An anchor plate is mounted between the seat belt and a fixed point on a vehicle. The anchor plate is partially mounted in housing. A spring is mounted between the housing and the anchor plate. Tension on the seat belt causes the anchor plate to move relative to the housing. A magnetic field generator is mounted to the anchor plate. The magnetic field generator moves as the anchor plate moves. A magnetic field sensor is mounted to the housing. The sensor generates an electrical signal in response to movement of the magnetic field generator.

22 Claims, 4 Drawing Sheets

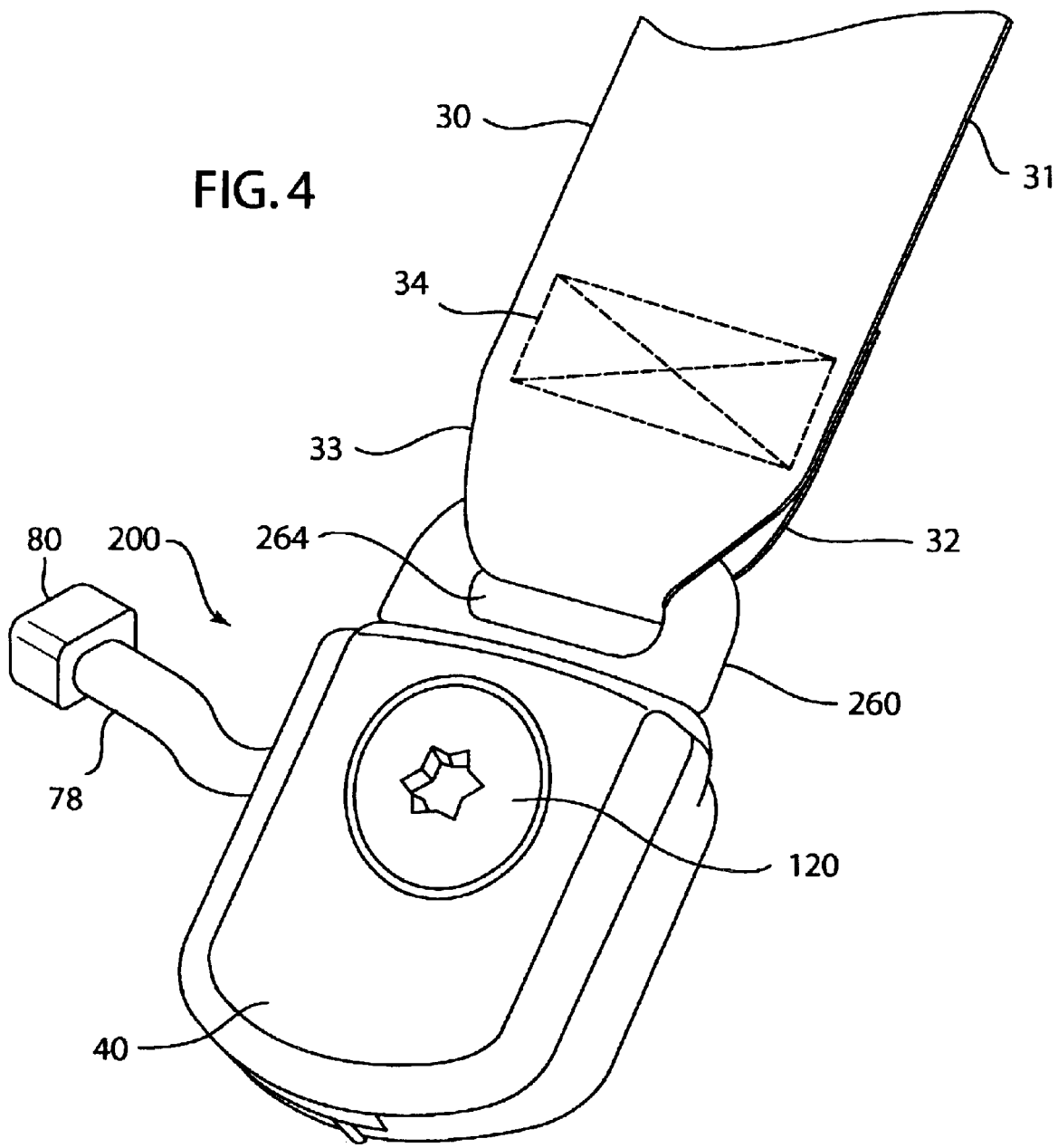

HALL EFFECT SEAT BELT TENSION SENSOR

CROSS REFERENCE TO RELATED APPLICATIONS

This application is related to the following U.S. patent applications:

U.S. patent application Ser. No. 09/923,151 filed Aug. 6, 2001 and titled, "Seat Belt Tension Sensor".

U.S. patent application Ser. No. 09/884,615 filed Jun. 19, 2001 and titled, "Seat Belt Tension Sensor with Overload Protection".

U.S. Pat. No. 6,209,915, issued Apr. 3, 2001 and titled, "Seat Belt Tension Sensor".

U.S. Pat. No. 6,211,668, titled, "Magnetic position sensor having opposed tapered magnets".

The foregoing patents have the same assignee as the instant application and are herein incorporated by reference in their entirety for related and supportive teachings.

BACKGROUND

1. Field of the Invention

This invention relates to an automobile sensor for detecting the magnitude of a tensile force in a seat belt used in a car seat, and in particular to a sensor that can detect the magnitude of tension in a seat belt and provide an electrical signal that is representative of the magnitude of tensile force.

2. Description of the Related Art

Air bags have been heralded for their ability to reduce injuries and save lives. However, since their incorporation into automobiles, a problem has existed with people of smaller size and small children. Air bags are designed to cushion the impact of occupants and thus reduce the injuries suffered. However, the force needed to properly cushion the occupant varies based on the size and position of the person.

For example, a larger person requires the bag to inflate faster and thus with more force. A smaller person may be injured by a bag inflating at this higher inflation force. A smaller person is more likely to be sitting close to the dashboard and would therefore stand a higher chance of being injured by the impact of the inflating bag, as opposed to the passenger hitting the fully inflated bag to absorb the impact of the accident. An average-sized person can also be injured by an airbag inflation if they are leaning forward, as for example, if they are adjusting the radio.

Because of the concern over injury to passengers in these situations, the National Highway Transportation Safety Administration (or NHTSA), an administrative agency of the United States, is instituting rules under FMVSS 208 requiring the air bag deployment system to identify the passenger size and position and inflate the air bag accordingly.

One way to accomplish this task is to use a seat belt tension sensor in conjunction with an occupant weight sensor. The weight sensor can provide an indication of the force placed by an occupant on the seat. However, if the seat belt is unduly tightened, it can place an additional downward force on the passenger, creating an erroneous weight reading. Similarly, it is common for infant car seats to be secured tightly to the seat. In this circumstance, it is critical for the system to recognize that the passenger does not warrant inflation of the air bag. By sensing the tension on the seat belt in addition to the weight reading from the seat, the actual weight of the occupant can be determined. This allows for the system to safely deploy the air bag.

SUMMARY

It is a feature of the present invention to provide a hall effect seat belt tension sensor for attachment between a seat belt and a vehicle.

Another feature of the invention is to provide a seat belt tension sensor that includes a housing mounted to a seat belt. An anchor plate is mounted between the seat belt and a fixed point on a vehicle. The anchor plate is partially mounted in housing. A spring is mounted between the housing and the anchor plate. Tension on the seat belt causes the spring to be compressed and the anchor plate to move relative to the housing. A magnetic field generator is mounted to the anchor plate. The magnetic field generator moves as the anchor plate moves. A magnetic field sensor is mounted to the housing. The sensor generates an electrical signal in response to movement of the magnetic field generator.

BRIEF DESCRIPTION OF THE DRAWINGS

FIG. 4 is an assembled view of FIG. 3.

It is noted that the drawings of the invention are not to scale.

DETAILED DESCRIPTION

Figure 1:
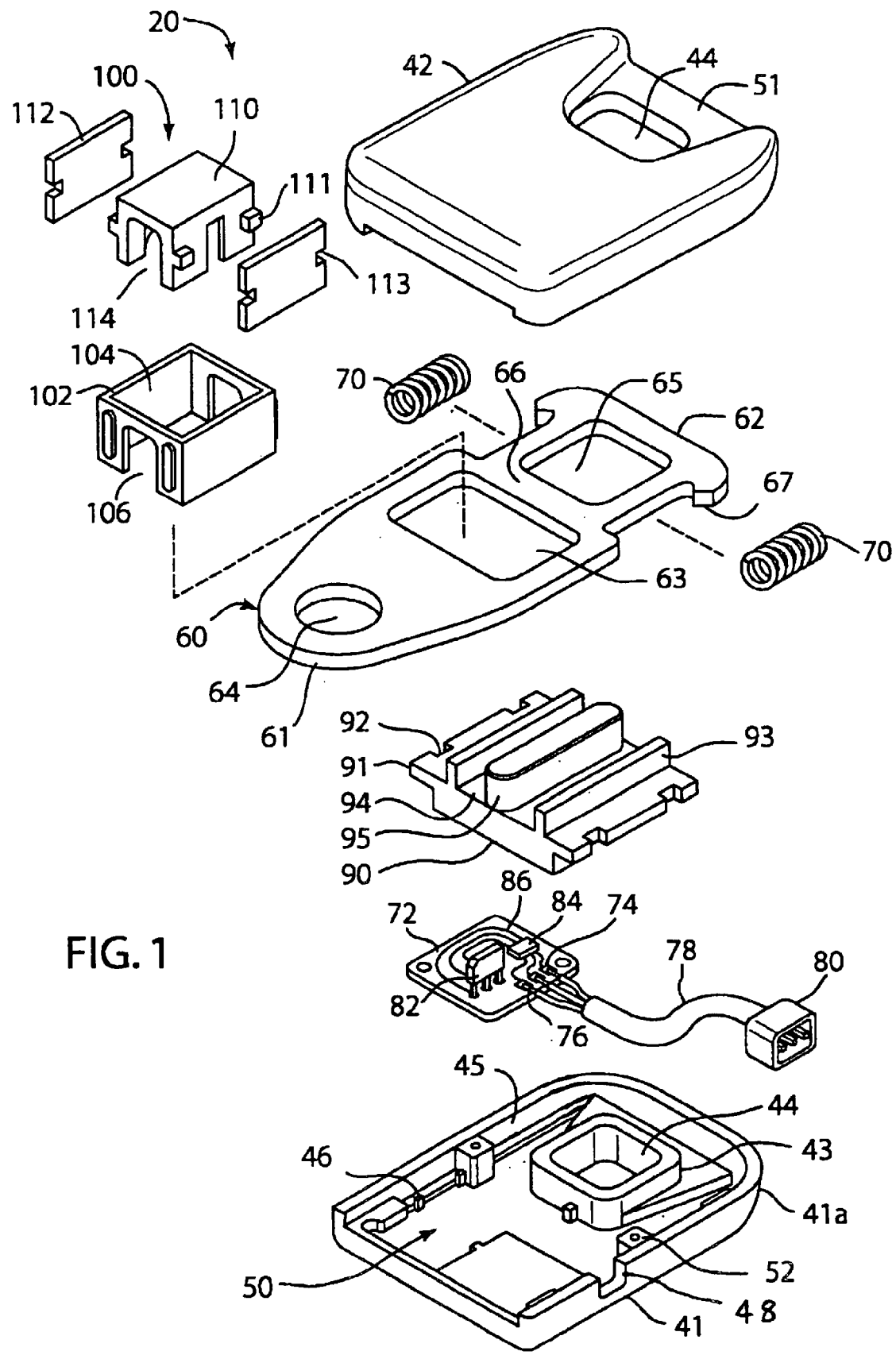
FIG. 1 is a perspective exploded view of the preferred embodiment of a hall effect seat belt tension sensor.
Figure 2:
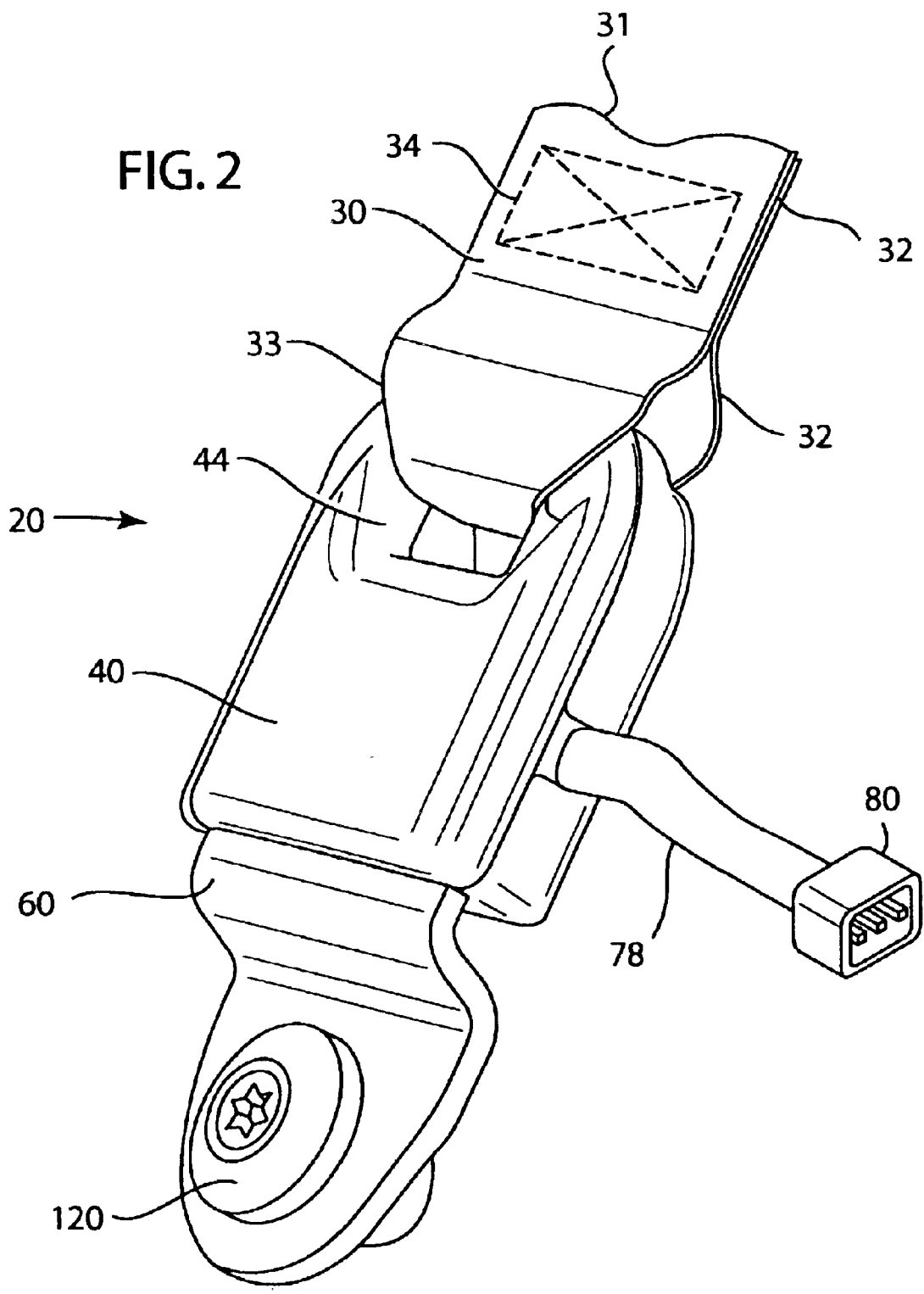
FIG. 2 is an assembled view of FIG. 1.

The present invention is a seat belt tension sensor. Referring to FIGS. 1 and 2, a seat belt tension sensor assembly 20 shown., Assembly 20 has a housing 40 and anchor plate 60. Housing 40 is fastened between a seat belt webbing 30 and a structural part of the vehicle such as a floor (not shown). The belt webbing 30 has an end 31, an end 32, a belt loop 33 and stitching 34 that retains end 32.

Housing 40 has a bottom portion 41, top portion 42, flange 43, hole 44, spring channel 45, posts 46, groove 48. A cavity 50 is located within housing 40. The bottom portion 41 and top portion 42 connect together and are held together by ultrasonic welding along lip 41A. Housing portion 42 has a recess or narrow portion 51 on an end of the housing where the seat belt wraps around.

Anchor plate 60 is loosely fitted within housing 40. Anchor plate 60 includes ends 61 and 62, a cutout 63, apertures 64 and 65. Arm 66 extends between aperture 65 and cutout 63. A projection 67 extends from end 62. The anchor plate 60 is located in cavity 50. Aperture 65 goes over and surrounds flange 43. A gap (not shown) is formed between flange 43 and aperture 65.

Seat belt webbing 30 is attached through hole 44 and aperture 65. The end 32 of webbing 30 is routed through hole 44 and aperture 65, wrapped back onto itself forming loop 33 and sewn with stitching 34 to secure the seat belt webbing to assembly 20.

A spring 70 is mounted in spring channel 45. One end of spring 70 is mounted over projection 67. The other end of spring 70 rests against a block 52 in cavity 50.

A printed circuit board 72 is located in a carriage 90. Printed circuit board 72 is shaped to fit around one side of flange 43. Printed circuit board 72 has pads 74 or holes that are soldered to wires 76 of wire harness 78. The other end of wire harness 78 has a connector 80 attached. A magnetic field sensor or hall effect device 82 is mounted in printed circuit board 72 and extends upwardly. Electronic circuitry 84, such as an integrated circuit can be attached to the printed circuit board to amplify and filter the signal from the hall effect device 82. Circuit lines 86 connect the hall effect device to the circuitry 84 and pads 74. Printed circuit board 72 has holes 73 that fit over pins (not shown) in carriage 90 above to hold the printed circuit board in position.

Circuit board 72 is attached to a carriage 90. The circuit board 72 is attached to carriage 90 by heat staking pins (not shown) that are inserted through holes in the circuit board. The circuit board is then encapsulated with a sealant such as silicone to protect the electronic components.

The carriage 90 and circuit board 72 are mounted in cavity 50. Slots 92 mount over posts 46. The posts are then heat staked to attach carriage 90 to housing 41. Carriage 90 has a pair of outwardly extending wings 91 having a slot 92. A pair of rails extend upwardly and define a groove 94. A hollow ridge 95 extends upwardly between grooves 94. Slots 92 fit over posts 46 to hold carriage 90 in cavity 50. Hall effect device 82 extends up into a slot (not shown) inside hollow ridge 95. Rails 93 and ridge 95 extend up into mortise 106 of magnet carrier 102.

A magnetic field generator or magnet assembly 100 includes a magnet carrier 102 and a magnet 110. Magnet carrier 102 has a cavity 104 and a mortise 106. The magnet carrier is preferably formed from an insulative material such as a plastic. A magnet 110 has a groove 114 and posts 111. Pole pieces 112 are mounted on each side of magnet 110. Pole pieces 112 have recesses 113 that fit over posts 111. Pole pieces 112 guide the flux field generated by magnet 110. Magnet 110 preferably is tapered and is adapted to generate a variable magnetic field along the length of the magnet. Details of the operation and manufacture of tapered magnet 110 can be found in U.S. Pat. No. 6,211,668 titled, "Magnetic position sensor having opposed tapered magnets". The contents of which are herein incorporated by reference. The magnet 110 could also be a non-tapered magnet or could be a magnet that has a variable field strength along its length. The magnet 110 may have a variable polarization or a variable magnetic domain alignment along its length.

Magnet assembly 100 is located in cutout 63 and rests on carriage 90. Ridge 95 extends into mortise 106 and slot 114. Magnet assembly 100 slides in groove 94 as the housing 40 moves relative to the anchor plate 60.

Seat belt tension sensor 20 is attached to a vehicle floor or seat or other member (not shown) by a fastener 120 such as a bolt, rivet or screw. Fastener 120 goes through aperture 64 and is attached to a vehicle structure or seat. The fastener shown is threaded; however, other types of fasteners would work such as a rivet.

When a tension is applied to seat belt 30, housing 40 moves relative to the anchor plate 60 resulting in the compression of springs 70. As housing 40 moves, carriage 90 and hall effect device 82 are moved relative to magnet assembly 100 which is held fixed by fastener 120 through anchor plate 60.

As the tension in the seat belt increases, housing 40 will move further in relation to anchor plate 60. This causes the hall effect device to move. The hall effect device is located adjacent to tapered magnet 110 which travels over ridge 95. The hall effect device outputs an electrical signal that is proportional to the strength of the perpendicular magnetic field that passes through the device. Since, the magnets are tapered, the strength of the magnetic field is variable along the length of the magnet.

Therefore, the resulting electrical output signal of the hall effect devices changes in proportion to the amount of tension in seat belt 30. This electrical signal is processed by electronic circuitry 84 and provided to an external electrical circuit by wire harness 78 to a conventional air bag controller or occupant classification module (not shown). The air bag controller can then use the seat belt tension information to compute a more accurate profile of the seat occupant and use that information to control deployment of the airbag.

Alternative Embodiment

Figure 3:
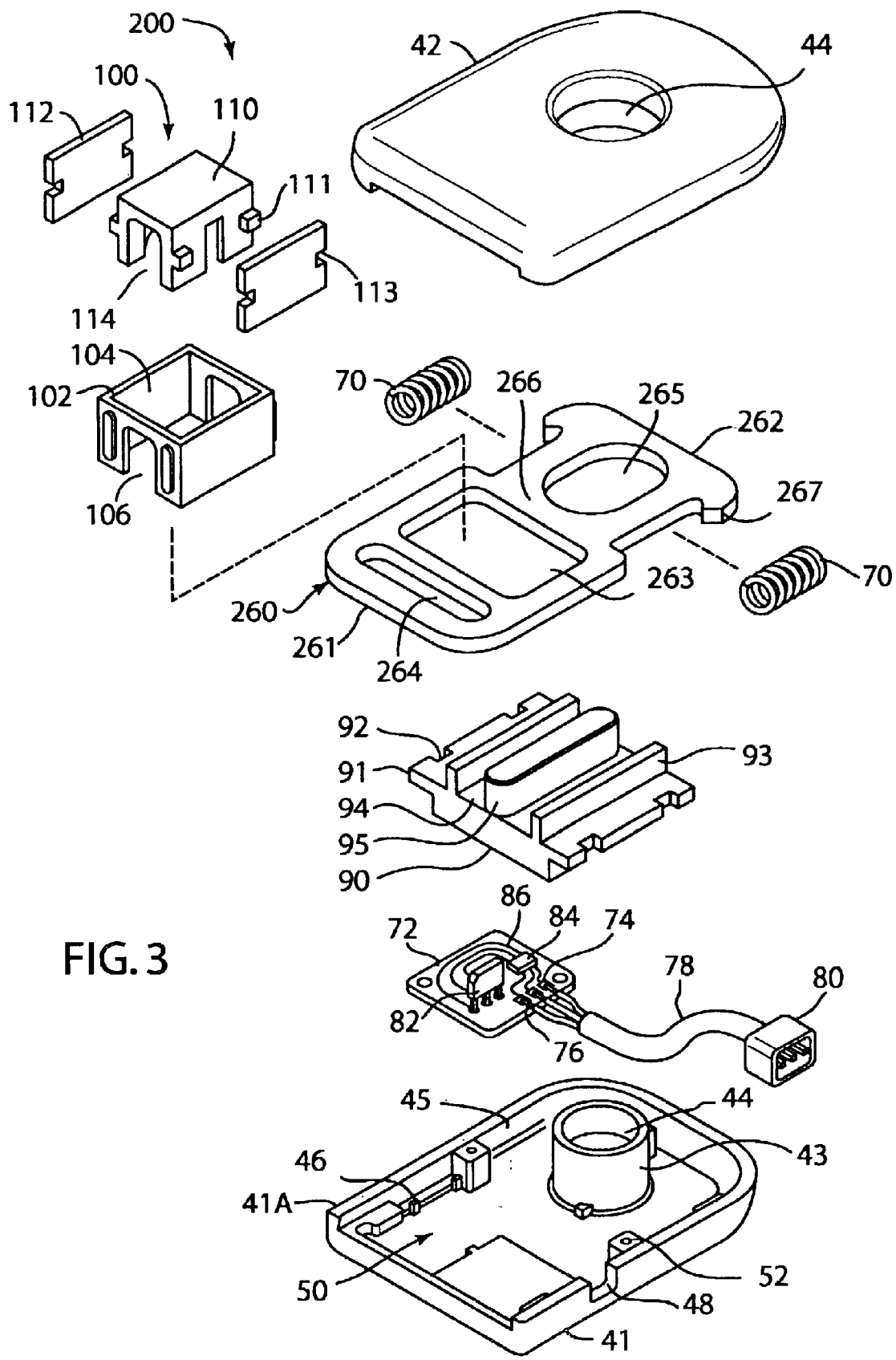
FIG. 3 is a perspective exploded view of another embodiment of a hall effect seat belt tension sensor.

Referring to FIGS. 3 and 4, an alternative embodiment of a seat belt tension sensor assembly 200 shown. Assembly 200 is similar to assembly 20 except that the housing is fixed in position the anchor plate moves. Assembly 200 has a housing 40 and anchor plate 260. Housing 40 is fastened between a seat belt webbing 30 and a structural part of the vehicle such as a floor (not shown). The belt webbing 30 has an end 31, an end 32, a belt loop 33 and stitching 34 that retains end 32.

Housing 40 has a bottom portion 41, top portion 42, flange 43, hole 44, spring channel 45, posts 46, groove 48, fastener hole 49. A cavity 50 is located within housing 40. The bottom portion 41 and top portion 42 connect together and are held together by ultrasonic welding along lip 41A. Housing portion 42 has a recess or narrow portion 51 on an end of the housing where the seat belt wraps around.

Anchor plate 260 is loosely fitted within housing 40. Anchor plate 260 includes ends 261 and 262, a cutout 263, apertures 264 and 265. Arm 266 extends between aperture 265 and cutout 263. A projection 267 extends from end 262. The anchor plate 260 is located in cavity 50. Aperture 265 goes over and surrounds flange 43. A gap (not shown) is formed between flange 43 and aperture 265.

Seat belt webbing 30 is attached through aperture 264. The end 32 of webbing 30 is routed through aperture 264, wrapped back onto itself forming loop 33 and sewn with stitching 34 to secure the seat belt webbing to assembly 20.

A spring 70 is mounted in spring channel 45. One end of spring 70 is mounted over projection 67. The other end of spring 70 rests against a block 52 in cavity 50.

A printed circuit board 72 is located in carriage 90. Printed circuit board 72 is shaped to fit around one side of flange 43. Printed circuit board 72 has pads 74 that are soldered to wires 76 of wire harness 78. The other end of wire harness 78 has a connector 80 attached. A magnetic field sensor or hall effect device 82 is mounted in printed circuit board 72 and extends upwardly. Electronic circuitry 84, such as an integrated circuit can be attached to the printed circuit board to amplify and filter the signal from the hall effect device 82. Circuit lines 86 connect the hall effect device to the circuitry 84 and pads 74. Printed circuit board 72 has holes 73 that fit over pins (not shown) in carriage 90 above to hold the printed circuit board in position.

Circuit board 72 is attached to a carriage 90. The circuit board 72 is attached to carriage 90 by heat staking pins (not shown) that are inserted through holes in the circuit board. The circuit board is then encapsulated with a sealant such as silicone to protect the electronic components.

Carriage 90 and circuit board 72 are mounted in cavity 50. Carriage 90 has a pair of outwardly extending wings 91 having a slot 92. A pair of rails extend upwardly and define a groove 94. A hollow ridge 95 extends upwardly between grooves 94. Slots 92 fit over posts 46 to hold carriage 90 in cavity 50. Hall effect device 82 extends up into a slot (not shown) inside hollow ridge 95. Rails 93 and ridge 95 extend up into cutout 263 of anchor plate 260.

A magnetic field generator or magnet assembly 100 includes a magnet carrier 102 and a magnet 110. Magnet carrier 102 has a cavity 104 and a mortise 106. The magnet carrier is preferably formed from an insulative material such as a plastic. A magnet 110 has a groove 114 and posts 111. Pole pieces 112 are mounted on each side of magnet 110. Pole pieces 112 have recesses 113 that fit over posts 111. Pole pieces 112 guide the flux field generated by magnet 110. Magnet 110 preferably is tapered and is adapted to generate a variable magnetic field along the length of the magnet. A non-tapered magnet could also be used as could an electromagnet. Details of the operation and manufacture of tapered magnet 110 can be found in U.S. Pat. No. 6,211,668 titled, "Magnetic position sensor having opposed tapered magnets". The contents of which are herein incorporated by reference.

Magnet assembly 100 is located in cutout 263 and rests on carriage 90. Ridge 95 extends into mortise 106 and slot 114. Magnet assembly 100 slides in groove 94 as the housing 40 moves relative to the anchor plate 260.

Seat belt tension sensor 200 is attached to a vehicle floor or seat or other member (not shown) by a fastener 120 such as a bolt, rivet or screw. Fastener 120 goes through aperture 265 and hole 44 and is attached to a vehicle structure or seat. The fastener shown is threaded; however, other types of fasteners would work such as a rivet.

When a tension is applied to seat belt 30, anchor plate 260 moves relative to housing 40 resulting in the compression of springs 70. As anchor plate 260 moves, magnet assembly 100 is moved relative to carriage 90 and hall effect device 82 which are held stationary by fastener 120.

As the tension in the seat belt increases, magnet 110 will be moved. The hall effect device is located adjacent to tapered magnet 110 which is inside ridge 95. The hall effect device outputs an electrical signal that is proportional to the strength of the perpendicular magnetic field that passes through the device. Since, the magnets are tapered, the strength of the magnetic field is variable along the length of the magnet.

Therefore, the resulting electrical output signal of the hall effect devices changes in proportion to the amount of tension in seat belt 30. This electrical signal is processed by electronic circuitry 84 and provided to an external electrical circuit by wire harness 78 to a conventional air bag controller or occupant classification module (not shown). The air bag controller can then use the seat belt tension information to compute a more accurate profile of the seat occupant and use that information to control deployment of the airbag.

Remarks

The seat belt tension sensor has several advantages. It allows accurate sensing of seat belt tension, without excessive movement of the seat belt. The seat belt tension sensor allows an airbag controller to make better decisions as to when and how to deploy and airbag based upon more accurate seat occupant information. In the case of a child's car seat being strapped into a car seat, the seat belt tension sensor in conjunction with a seat weight sensor allows the airbag controller to properly compute that the seat occupant has a low weight and to prevent deployment of the airbag.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A seat belt tension sensor that is attachable between a seat belt and a vehicle structure comprising:
    a) a housing having a cavity;
    b) a fixable anchor plate having a first portion located in the cavity, the anchor plate further having a cutout, the housing movable relative to the anchor plate between a first position and a second position;
    c) a magnet mounted in the cutout;
    d) a movable sensor mounted to the housing, the sensor generating an electrical signal in response to moving between the first and second positions, the electrical signal changing as a function of tension on the seat belt; and
    e) a spring located between the housing and the anchor plate, the spring urging the housing toward the first position.

2. The seat belt tension sensor according to claim 1, wherein a carriage is mounted in the housing and the magnet is mounted in a magnet carrier, the magnet carrier being slidably supported by the carriage, the magnet carrier located in the cutout.

3. The seat belt tension sensor according to claim 2, wherein the magnet generates a variable magnetic field.

4. The seat belt tension sensor according to claim 3, wherein the magnet is tapered.

5. The seat belt tension sensor according to claim 2, wherein the sensor is a hall effect device.

6. The seat belt tension sensor according to claim 5, wherein a wire harness is attached to the sensor and extends from the housing.

7. The seat belt tension sensor according to claim 2, wherein the carriage is mounted over the sensor.

8. The seat belt tension sensor according to claim 1, wherein the anchor plate has a first and second aperture, the cutout located between the apertures.

9. The seat belt tension sensor according to claim 8, wherein a fastener passes through the second aperture and is affixed to the vehicle structure.

10. The seat belt tension sensor according to claim 9, wherein the seat belt passes through the first aperture.

11. A seat belt tension sensor for that is attachable between a seat belt and a vehicle structure comprising:
    a) a housing having a cavity and an apertured flange;
    b) an anchor plate having a cutout and a first and second aperture, the anchor plate at least partially mounted in the cavity, the apertured flange extending through the second aperture, the housing movable relative to the anchor plate;
    c) a carnage mounted to the housing;
    d) a magnet mounted in the cutout adjacent the carriage, the magnet moving as the anchor plate moves, the magnet further being guided by the carriage; and
    e) a magnetic field sensor mounted to the housing under the carriage, the carriage protecting the magnetic field sensor, the sensor generating an electrical signal in response to movement between the housing and the anchor plate, the electrical signal changing as a function of tension on the seat belt.

12. The seat belt tension sensor according to claim 11, wherein a spring is located between the housing and the anchor plate.

13. The seat belt tension sensor according to claim 11, wherein the magnet is mounted in a magnet carrier, the magnet carrier being slidably supported by the carriage.

14. The seat belt tension sensor according to claim 11, wherein the magnet is tapered.

15. The seat belt tension sensor according to claim 11, wherein the magnetic field sensor is a hall effect device.

16. The seat belt tension sensor according to claim 11, wherein a fastener passes through the first aperture and is affixed to the vehicle structure.

17. The seat belt tension sensor according to claim 11, wherein the seat belt passes through the first aperture.

18. The seat belt tension sensor according to claim 11, wherein a printed circuit board is mounted in the housing, the hall effect device mounted to the printed circuit board.

19. A seat belt tension sensor comprising:
   a) a housing that is adapted to be mounted to a seat belt, the housing having an aperture;
   b) an anchor plate that is mountable between the seat belt and a fixed point on a vehicle, the anchor plate having a cutout and further being partially mounted in the housing;
   c) a spring set between the housing and the anchor plate, tension on the seat belt causing the spring to be compressed and the housing to move relative to the anchor plate;
   d) a magnetic field generator supported in the cutout; and
   e) a magnetic field sensor mounted to the housing adjacent the magnetic field generator, the magnetic field sensor moving in response to an applied tension on the seat belt, the magnetic field sensor generating an electrical signal that is proportional to the applied tension.

20. The seat belt tension sensor according to claim 19, wherein the anchor plate has a first and second aperture, the seat belt attachable through the first aperture.

21. The seat belt tension sensor according to claim 20, wherein a fastener is attached through the second aperture to the fixed point.

22. A seat belt tension sensor comprising:
   a) a housing that is adapted to be mountable to a seat belt, the housing having an apertured flange, the housing adapted to be secured to a vehicle;
   b) an anchor plate having a cutout, a first aperture and a second aperture, the apertured flange extending through the second aperture, the anchor plate being partially mounted in the housing, the first aperture adapted to be attachable with a seat belt;
   c) a spring set between the housing and the anchor plate, tension on the seat belt causing the spring to be compressed and the anchor plate to move relative to the housing;
   d) a magnet supported in the cutout;
   e) a carriage mounted to the housing, the magnet slidably supported by the carriage; and
   e) a magnetic field sensor mounted to the housing under the carriage, the magnetic field sensor generating an electrical signal that is proportional to the magnitude of tension applied to the seat belt.

* * * * *